July 26, 1966         E. A. RANDICH         3,262,650
        MEANS FOR LATERALLY POSITIONING ROLL OF WEB
             MATERIAL RELATIVE TO SLITTER BLADES
Filed Nov. 12, 1964                    2 Sheets-Sheet 1

INVENTOR.
ERASMUS A. RANDICH.
BY William V. Hogg

ATTORNEY

July 26, 1966  E. A. RANDICH  3,262,650
MEANS FOR LATERALLY POSITIONING ROLL OF WEB
MATERIAL RELATIVE TO SLITTER BLADES
Filed Nov. 12, 1964  2 Sheets-Sheet 2

INVENTOR.
ERASMUS A. RANDICH.
BY William N. Hogg
ATTORNEY

United States Patent Office 3,262,650
Patented July 26, 1966

3,262,650
MEANS FOR LATERALLY POSITIONING ROLL OF WEB MATERIAL RELATIVE TO SLITTER BLADES
Erasmus A. Randich, McCandless Township, Allegheny County, Pa., assignor to Allegheny Ludlum Steel Corporation, Brackenridge, Pa., a corporation of Pennsylvania
Filed Nov. 12, 1964, Ser. No. 410,652
11 Claims. (Cl. 242—56.2)

This invention relates generally to the control of scrap in side trimming operations, and more particularly to a method and device for accurately and quickly adjusting the amount of scrap trimmed from the side of sheet or strip material.

During and following the processing of many types of sheet and strip material, the unusable edge portions must be trimmed to provide material of uniform quality across the entire width of the sheet or strip product. Side trimming operations are often performed several times on a given sheet or strip product as it progresses through the various processing operations to a final product. For example, in the steel industry side trimming of steel strip may take place following hot rolling and one or more times between cold rolling operations, and often the final operation before shipping includes side trimming. The amount of material removed by the side trimming operation must be very closely controlled, inasmuch as if insufficient material is removed, the quality of the product at the edges will be poor, and if too much material is removed, good material is being scrapped with the attendant monetary loss. Also, in slitting operations accurate positioning of the knives is necessary.

It is therefore a principal object of this invention to provide a method and device for accurately and quickly positioning coils relative to slitting or side trimming knives.

Another object of this invention is to provide a method and device for closely controlling the amount of material trimmed by a side trimmer from the edge of sheet or strip products or controlling the widths of multiples slit from sheet or strip products.

A related object of this invention is the provision in a side trimming line or slitting line, of a device which will permit rapid adjustment to provide for side trimming of a selectable amount of material from the edge of accurate slitting of sheet or strip material.

A further object of this invention is the provision of a device for accurately adjusting the amount of material trimmed from the edge of coiled strip material as it is being fed through a side trimmer.

Still a further, more particular object of this invention is the provision of a device for quickly changing the amount of material trimmed from the edge of sheet or strip material by a side trimmer as conditions vary during the trimming operation.

Yet another, more specific object of this invention is the provision of a device which will permit rapid adjustment of the side trimmer during a side tripping operation to maintain the strip in a position to allow a selective amount to be trimmed from the sides of the strip when the position of the strip varies.

These and other objects, together with a fuller understanding of the invention, will become apparent from the following description when taken in conjunction with the accompanying drawings in which.

Figure 1:
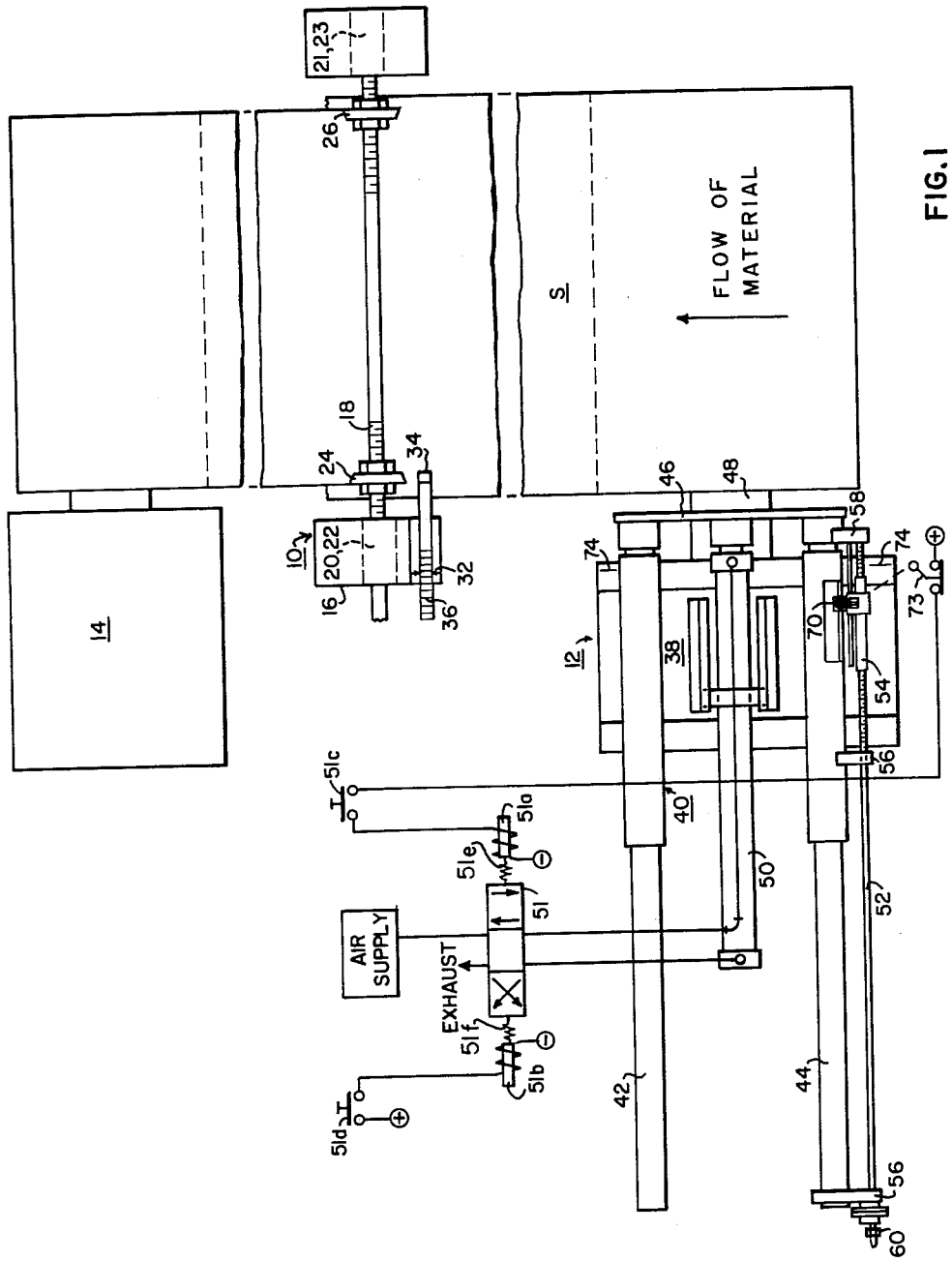
FIGURE 1 is a plan view, somewhat schematic, of the device of this invention utilized in conjunction with an uncoiler and side trimming apparatus.

Referring now to the drawings, the device of this invention is shown incorporated in a side trimming line which is comprised of side trimmer 10, an uncoiler 12 and a recoiler 14. The uncoiler 12 mounts a coiled strip of material designated generally as "S." The recoiler 14 draws the strip through the side trimmer 10 where the desired amount of material is trimmed from the sides of the strip S and the strip is then rewound on the recoiler 14.

The side trimmer 10 includes a housing 16 on which is journalled an upper arbor 18 in bearings 20 and 21, and also on which is journalled a lower arbor 19 in bearings 22 and 23. The upper arbor 18 is threaded to receive circular shear knives 24 and 26, and the lower arbor 19 is similarly threaded to receive shear knives 28 and 30. The shear knives 24 and 28 constitute a first pair or set of knives to shear the left edge of the strip (as viewed in FIG. 2), and the shear knives 26 and 30 constitute a second pair or set of shear knives to shear the right edge of the strip (as viewed in FIG. 2). To accommodate different widths of strip, the position of shear knives can be adjusted laterally on their respective arbors and secured by nuts in a well-known manner. The knives shear in a conventional manner. A reference or indicia line 32 is inscribed on the support 16; and extending from the reference line 32 is a scale 34 which is calibrated with suitable indicia lines 36. The scale 34 may be permanently affixed to the support 16, or it may be a separate scale which is used to measure from the reference line 32 when measurement becomes necessary, as will be discussed hereinafter.

The uncoiler 12 has a stationary support base 38 on which is slidably supported a positioning yoke 40. The positioning yoke 40 includes a pair of support arms 42 and 44 which are secured to a coil edge positioning or stripper plate 46. A mandrel 48, which is supported in a conventional manner by the support base 38, extends outwardly and supports coiled strip of material S. An air cylinder 50 is mounted on the uncoiler support base 38 and is operatively connected to the positioning yoke 40 and disposed to move the positioning yoke 40 laterally from right to left and left to right as seen in FIG. 1. The air cylinder 50 is operated from a source of compressed air through a conventional four-way reversing valve 51. The valve 51 is actuated by a pair of solenoids 51a and 51b, which are actuatable by normally open contacts 51c and 51d and springs 51e and 51f respectively. When solenoid 51a is energized, the valve 51 will connect the air cylinder 50 to the air supply to drive the yoke 40 to the right as seen in FIG. 1, and when solenoid 51b is energized, the valve 51 will connect the air cylinder 50 to the air supply to drive the yoke to the left as seen in FIG. 1. When neither solenoid 51a or 51b is energized, the air cylinder 50 will be isolated by the valve 51 from the air supply and the yoke 40 will remain stationary.

Figure 2:
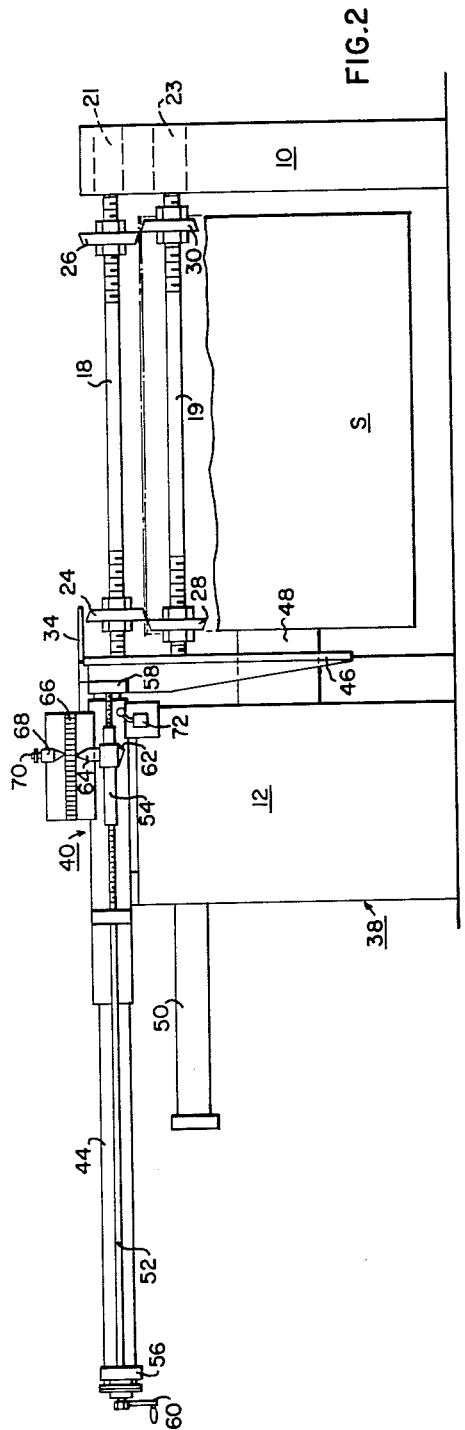
FIG. 2 is a front elevational view of the device of this invention incorporated at the uncoiler.
Figure 3:
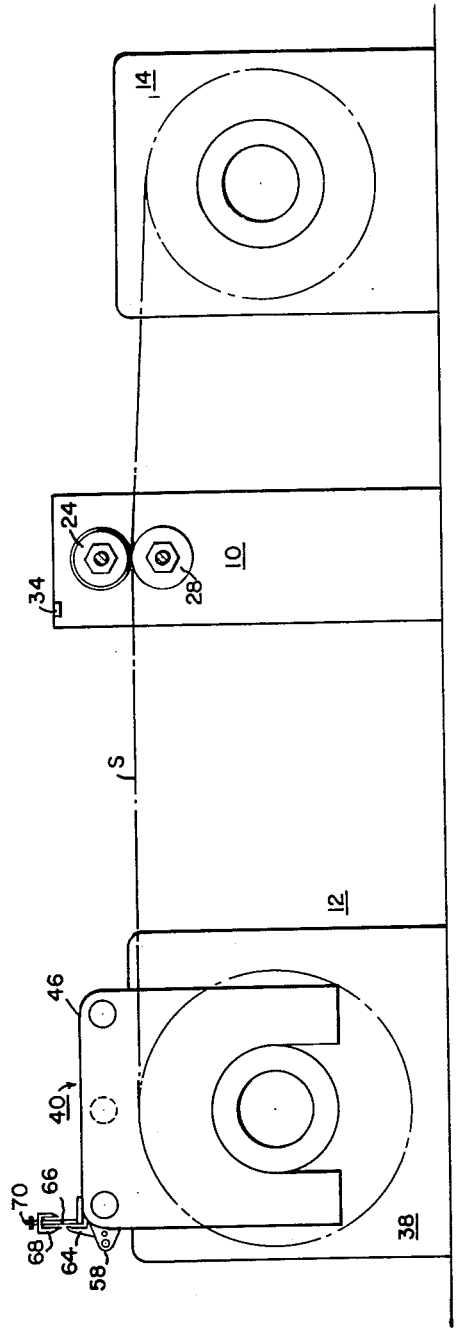
FIG. 3 is an end elevational view of the device of this invention incorporated at the uncoiler.

The support arm 44 of the yoke has secured thereto a threaded rod 52 on which is threadably mounted a sleeve 54. The rod 52 is journalled in bearings 56 and 58 and is rotatable by means of a crank 60. Rotation of the crank will, in a well-known manner, move the sleeve 54 axially along the rod, the direction of movement depending upon the direction of rotation of the crank. The sleeve 54 is provided with a lower cam surface 62, and also with a pointer 64 which extends upwardly therefrom as seen in FIG 2. A calibrated scale 66 is secured to the support base 38 adjacent the pointer 64. A marker 68 is mounted adjacent the scale 66 and is slidable therealong. The marker 68 is provided with a locking screw 70 to selectably secure it against movement in any selected position.

A cam operated limit switch 72 is mounted on the uncoiler support base 38, and is positioned to coact with the cam surface 62 of the sleeve 54. The cam switch 72 includes a normally closed contact 73 connected in series with contact 51c. When the cam switch 72 is actuated by the cam surface 62, contact 73 will be opened. This, in a known manner, will prevent the solenoid 51a from being energized, even when contact 51c is closed.

*Operation*

In order to select precisely the amount of scrap which will be trimmed from each side of the strip, the shear knives 24 and 28 are adjusted on their respective arbors at the optimum position or any selected position to shear the left edge of the strip S (as viewed in FIG. 2). The set of shear knives 26 and 30 is then set at a proper distance on their respective arbors with respect to the set of shear knives 24 and 28 to shear the right side of the strip so that the desired width of the strip S will emerge from side trimmer 10. When the set of shear knives 24 and 28 has been set at the proper distance, the scale 34 is used to measure their distance out from the reference line 32. The crank 60 is then turned in a direction to move the sleeve 54 to its far left position (as viewed in FIG. 1) and the air cylinder 50 is actuated by closing contact 51c to move the edge of the stripper plate 46 into exact alignment with the shear knife set 24 and 28. This distance can be determined by measuring the same distance out from indicia line 74 on the support base 38 as was measured for the shear knife set 24 and 28 from the reference line 32. (Indicia line 74 is aligned with reference line 32.) When the coil edge positioning plate 46 is in this position aligned with the shear knives 24 and 28, the air cylinder 50 is deactuated by opening contact 51c. The crank 60 is then turned to move the sleeve 54 to a position where the cam surface 62 just strikes the cam switch 72. The marker 68 is then adjusted so that it is opposite and aligned with the pointer 64, and this becomes the base or reference position for the coil edge positioning plate 46, in which position the edge of the coil supported on the mandrel 48, with its left edge against the positioning plate 46, will be in such a position that the left edge of the coil is in exact alignment with the shear knife set 24 and 28. The crank 60 is then turned until the sleeve 54 has moved to the right a distance from the reference position equal to the width of scrap desired to be trimmed from the left edge of the strip S. Preferably this movement should be done after actuating the air cylinder by closing contact 51d to return the yoke to its far left position to avoid causing the cam surface 64 to override the cam switch 72, which would happen if the adjustment were made in the forward position with the cam surface 64 in contact with the cam switch 72. The air cylinder 50 is then actuated, by closing contact 51c, to move the yoke 40 to the right, and movement of the yoke will continue until the cam switch 72 is contacted by the cam surface 64 which will open contact 73 which, in turn, will prevent further movement of the yoke by de-energizing solenoid 51a. This movement will stop when the positioning plate 46 is positioned out of alignment to the left of the shear knives 24 and 28 a distance equal to the distance the sleeve 54 has been moved from its reference position and will therefore provide for this width of edge material to be trimmed from the left edge of the strip S as it passes through the shear knife when the coil S is placed on the mandrel with its left edge against the stripper plate 46. Since the knives 26 and 30 have been previously set with respect to knives 24 and 28, the width of material emerging will be the exact selected width and an exact selected amount will be sheared from each side of the strip S. If it should happen that the strip S should have a cambered condition, or if for some other reason the amount of material to be sheared from the left edge of the strip has to be changed, the operation can be stopped, the positioning plate 46 returned to the left position and a new setting quickly made so that the operation may be immediately resumed. This rapid adjustment can be made since the shearing is not being done to a center line but rather is being based from a fixed side reference point which can be quickly established and will then be unvarying. Since a specific physical point can be worked to rather than an intangible center line, rapid corrections for misalignment can be made and rapid adjustment for varying strip widths can be made with a minimum of lost time and a maximum of accuracy.

As was indicated previously, the scale 34 may be permanently secured to the side trimmer support 16. In such a case, then, a given line of the scale becomes the reference line, this given line being the line that coincides with the reference line 32. The indications on the scale will increase from this given line to the right. The indications on the scale 66 carried by the support base 38 should be provided in such a manner that the zero point is at the far right side thereof and indicia markings on the scale should increase from right to left. The zero point should be so-selected that when the yoke is moved to its far left position and the sleeve 54 is moved by the crank 60 so that it points to the indicia marking corresponding to the indicia marking on the scale 34 at which the shear knives 24 and 28 are set, and when the air cylinder 50 is actuated to move the yoke to the right, the cam surface 64 will strike cam switch 72 to stop the movement when the positioning plate 46 is exactly aligned with the knife set 24 and 28. With this arrangement it is an extremely simple operation to set the uncoiler in a position to remove the exact amount of material from the edge of the strip S. When knife set 24 and 28 is set, their position is noted on the scale 34. The air cylinder 50 is then actuated to move the yoke 40 to its far left position and the crank is then turned to move the sleeve 40 until the pointer 62 is in line with the same indicia marking on the scale 66 as was read from the scale 34. The marking 68 is then set to this point to give the reference position, and the crank 60 is turned to move the sleeve 54 to the right from this reference position an amount equal to the width of material desired to be sheared from the left hand side of the strip S. The air cylinder 50 is then actuated and the cam surface 64 will strike cam switch 72 when the positioning plate 46 is out of line to the left of the shear knives 24 and 28 an amount equal to the selected width to be sheared from the left edge of the strip. Again, the shear knife set 26 and 30 has been previously set so that it will shear the strip to the proper width. Thus, when the scale 34 is secured to the side trimmer support 16 and the zero position on the scale 66 is properly selected, no actual measuring need be done other than noting the positions of the shear knife set 24 and 28 and moving the sleeve 54 the proper distances.

It will be readily appreciated that when a strip of a given width has been sheared to the proper width and the line is to be used to shear a strip to a different width, if the shear knife set 24 and 28 is allowed to remain at the same position, the only setting required will be to change the position of the shear knife set 26 and 30 to correspond to the new width. If a change in the width to be sheared off the edges is required, the yoke 40 and the sleeve 54 merely have to be returned to their original reference position and the new width selected by turning the crank 60 to move the sleeve 54 the desired amount. Such a rapid and easy change between widths of the strip cannot be made by conventional prior art set-ups, which shear to the center line rather than to a measured edge.

Although the invention has been described with reference to a side trimming line, it will be readily apparent to those skilled in the art that is equally adaptable to other similar devices such as slitters to accurately position the knives; hence the term side trimmer is intended to cover such similar device.

Although several embodiments of this invention have been shown and described, various adaptations and modifications may be made without departing from the scope and appended claims.

I claim:
1. Apparatus for cutting a strip of material comprising a shearing device having at least one selectively positionable set of cutting knives, a mounting device for supporting the strip of material for entrance to the shearing device, said mounting device including edge positioning means to locate one edge of the strip, means to move at least one of said devices laterally to change the entry position of said strip material with respect to a given position of each cutting knife set, first indicia means disposed to indicate the position of said edge positioning means and second indicia means disposed to indicate the position of at least one of said sets of cutting knives and to correlate the position thereof with the position of said positioning means.

2. Apparatus for cutting a strip of material comprising a shearing device having at least one set of selectively positionable cutting knives, a mounting device for supporting the strip of material for entrance into the shearing device, said mounting device including edge positioning means to locate one edge of the strip, means to move said mounting device laterally to change the entry position of said strip material to said shearing device, first indicia means disposed to indicate the position of the edge positioning means, and second indicia means disposed to indicate the position of at least one knife set and to correlate the position thereof with the position of said positioning means.

3. Apparatus for side trimming a strip of material comprising a side trimmer having first and second selectively positionable cutting knife sets, a mounting device for supporting the strip material for entrance to the side trimmer, said mounting device including edge positioning means to locate one edge of the strip, means to move said edge positioning means laterally to change the entry position of said strip material to said side trimmer, first indicia means disposed to indicate the position of said edge positioning means, and second indicia means disposed to indicate the position of said first cutting knife set and to correlate the position thereof with the position of said positioning means.

4. Apparatus for side trimming a coiled strip of material comprising a side trimmer having first and second selectively positionable cutting knife sets, a mounting device for supporting the coiled strip material for entrance to the side trimmer, said mounting device including a stop member disposed to locate one edge of the strip, means to move said stop member laterally to change the entry position of said strip material to said side trimmer, first indicia means disposed to indicate the position of said stop member, and second indicia means disposed to indicate the position of said first slitting knife set and to correlate the position thereof with the position of said stop member.

5. Apparatus for side trimming a coiled strip of material comprising a side trimmer having first and second selectively positionable cutting knife sets, a mounting device for supporting the coiled strip material for entrance to the side trimmer, said mounting device including a stop member disposed to locate one edge of the strip, means to move said stop member laterally to change the entry position of said strip material to said side trimmer, means to selectively limit the movement of said stop member, said means to limit the movement of the stop member including selectably positionable actuating means carried by said mounting device, first indicia means disposed to indicate the position of said stop member, and second indicia means disposed to indicate the position of said first cutting knife set and to correlate the position thereof with the position of said stop member.

6. Apparatus for side trimming a coiled strip of material comprising a side trimmer having first and second selectively positionable cutting knife sets, a mounting device for supporting the coiled strip material for entrance to the side trimmer, said mounting device including stop means to locate one edge of the strip, means to move said stop means laterally to change the entry position of said strip material to the side trimmer, means to selectively limit the movement of said mounting device, said means to limit the movement of said mounting device including selectably positionable cam means carried by said mounting device and limit switch means actuatable by said cam means and connected to prevent further movement of said mounting device when actuated by said cam means, first indicia means disposed to indicate the position of said stop means, and second indicia means disposed to indicate the position of said first cutting knife set and to correlate the position thereof with the position of said stop means.

7. The combination of claim 6, wherein said cam means includes pointer means and scale means to indicate the position of the stop means.

8. Apparatus for cutting a coiled strip of material comprising a shearing device having at least one selectively positionable cutting knife set, a mounting device for supporting the strip material for entrance to the shearing device, said mounting device including coil support means and means to locate one edge of the strip, carriage means to move said means to locate the edge of the strip laterally to change the entry position of said strip material to said side trimmer, means to limit the movement of the carriage means, said means to limit the movement of the carriage means including a co-actable cam member and limit switch member connected to prevent further movement of the carriage when the limit switch member is actuated by the cam member, one of said members being mounted on said carriage means and the other member being mounted independently of said carriage means, means to selectively position one of said members to thereby select the position of coaction of said members, first indicia means disposed to indicate the position of said means to locate the edge of the coil, and second indicia means disposed to indicate the position of one of said cutting knife sets and to correlate the position thereof with the position of said means to locate the edge of the coil, whereby the relative position of the strip entering the side trim knives can be selected and maintained.

9. The combination of claim 8 wherein said cam member is selectively positionable.

10. The combination of claim 8 wherein said cam member is mounted on said carriage.

11. The combination of claim 10 wherein said cam member is selectively positionable.

References Cited by the Examiner

UNITED STATES PATENTS

| | | | |
|---|---|---|---|
| 3,096,919 | 7/1963 | Snyder | 226—20 X |
| 3,177,751 | 4/1965 | Vercanteren | 83—367 X |

ANDREW R. JUHASZ, *Primary Examiner.*